(12) United States Patent
Lee et al.

(10) Patent No.: US 9,387,405 B2
(45) Date of Patent: Jul. 12, 2016

(54) GAME JOYSTICK

(71) Applicant: Cheng Uei Precision Industry Co., Ltd., New Taipei (TW)

(72) Inventors: Tsung Shih Lee, New Taipei (TW); Li Wen Lin, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 271 days.

(21) Appl. No.: 14/267,807

(22) Filed: May 1, 2014

(65) Prior Publication Data
US 2015/0314193 A1 Nov. 5, 2015

(51) Int. Cl.
*A63F 9/24* (2006.01)
*A63F 13/24* (2014.01)

(52) U.S. Cl.
CPC ..................................... *A63F 13/24* (2014.09)

(58) Field of Classification Search
None
See application file for complete search history.

(56) References Cited

U.S. PATENT DOCUMENTS

| | | | | |
|---|---|---|---|---|
| 7,548,419 B1 * | 6/2009 | Lai | .......................... | G06F 1/1616 347/54 |
| 7,901,225 B2 * | 3/2011 | Maruyama | .............. | G06K 13/08 439/159 |
| 8,182,298 B1 * | 5/2012 | Lin | ..................... | H01R 13/2421 439/816 |
| 2006/0089034 A1 * | 4/2006 | Chen | ..................... | H05K 5/0013 439/164 |
| 2010/0226714 A1 * | 9/2010 | Chiang | ................. | H05K 5/0013 403/325 |
| 2010/0330825 A1 * | 12/2010 | Fan | ..................... | H01R 13/2471 439/82 |
| 2015/0306495 A1 * | 10/2015 | Lee | .......................... | A63F 13/24 463/37 |

* cited by examiner

*Primary Examiner* — Jason Yen
(74) *Attorney, Agent, or Firm* — Cheng-Ju Chiang

(57) ABSTRACT

A game joystick includes a lower half body, an upper half body covering on the lower half body, a battery cover covering on the upper half body and elastic elements mounted in the upper half body. The upper half body is concaved downward to form a plurality of buckling slots. An opening is opened in one sidewall of each buckling slot. The battery cover protrudes downward to form a plurality of buckling strips of which each defines a first pushing surface and a second pushing surface. The elastic element has a first elastic arm fastened in the upper half body, and a second elastic arm passing through the opening to elastically project in the buckling slot. The second elastic arms cooperate with the first pushing surfaces and the second pushing surfaces of the buckling strips inserted into the buckling slots to close or open the battery cover easily.

10 Claims, 7 Drawing Sheets

GAME JOYSTICK

BACKGROUND OF THE INVENTION

1. Field of the Invention

The present invention relates to a game joystick capable of opening and closing a battery cover easily.

2. The Related Art

Nowadays, a game joystick is acted as a common part of the electric game machine and is used to control an object or character of a game by operating buttons on the game joystick. A traditional game joystick includes an upper half body defining a pair of battery slots at two sides thereof, a lower half body and at least one battery cover. The upper half body covers on the lower half body. The battery cover covers on the upper half body for covering the battery slots and holding batteries in the battery slots. At least one crook is protruded downward from a bottom side of the battery cover and snap-fitted in the upper half body for fastening the battery cover and the upper half body together.

However, opening the battery cover of the traditional game joystick need take a lot of effort and the crook of the battery cover is easily damaged on account of the difficult open action. So a game joystick capable of overcoming the forgoing problems is required.

SUMMARY OF THE INVENTION

Accordingly, an object of the present invention is to provide a game joystick which includes a lower half body, an upper half body covering on the lower half body, a battery cover covering downward on the upper half body and a plurality of elastic elements. A top face of the upper half body is concaved downward to form a plurality of buckling slots. An opening is opened in one sidewall of each buckling slot. A bottom face of the battery cover protrudes downward to form a plurality of buckling strips corresponding to the buckling slots of the upper half body. The buckling strips are inserted into the buckling slots respectively to close the battery cover. A bottom end of each buckling strip defines a first pushing surface facing the opening of the buckling slot. One side of each buckling strip towards the opening is concaved inward and extends vertically to form a slide slot. A bottom face of the slide slot is designed to a second pushing surface facing the opening of the buckling slot. The elastic elements are mounted in the upper half body in accordance with the buckling slots of the upper half body. Each elastic element has an elastic body, a first elastic arm and a second elastic arm. The first elastic arm is fastened in the upper half body. The second elastic arm passes through the corresponding opening to elastically project in the buckling slot of the upper half body. The second elastic arm is capable of sliding over the first pushing surface of the buckling strip to insert into the slide slot of the buckling strip and resist against the second pushing surface when close the battery cover.

As described above, the embodiment of the invention of the game joystick utilizes the first pushing surface and the second pushing surface pushing the elastic element to rotate in clockwise direction to easily open and close the battery cover, and utilizes the elastic element releasing the elastic potential energies to rotate in counterclockwise direction to stably buckle with the buckling strip of the battery cover so as to prevent the battery cover from dropping from the game joystick.

BRIEF DESCRIPTION OF THE DRAWINGS

The present invention will be apparent to those skilled in the art by reading the following description thereof, with reference to the attached drawings, in which.

DETAILED DESCRIPTION OF THE EMBODIMENT

Figure 1:
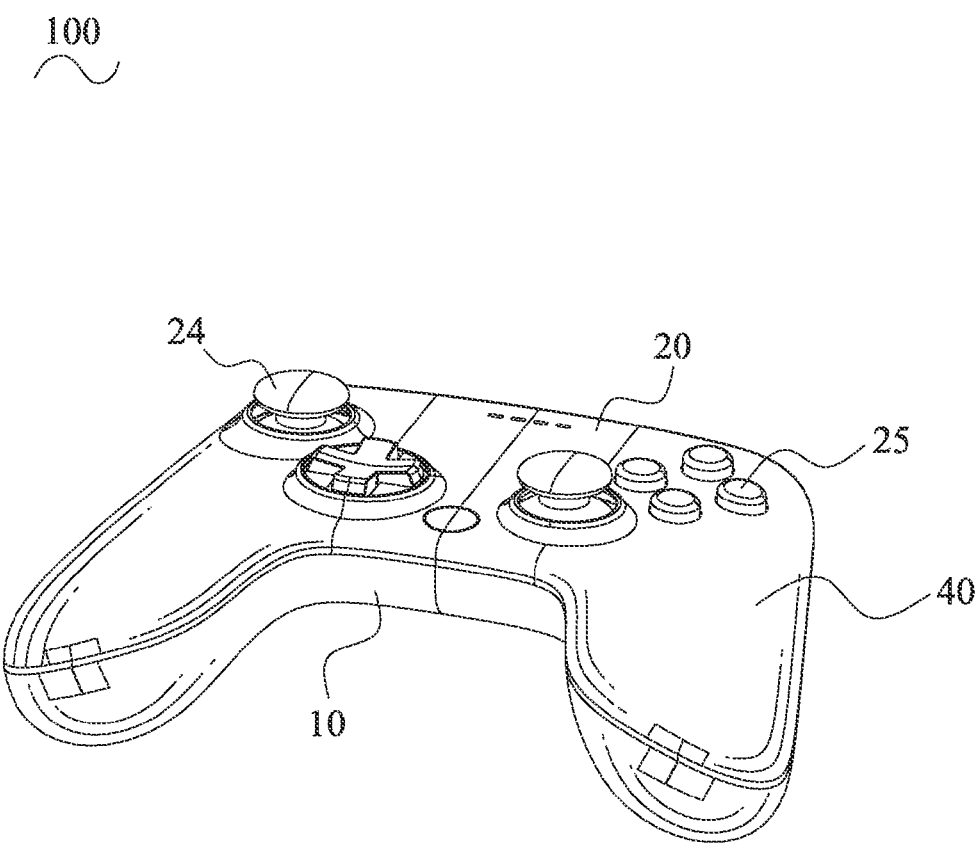
FIG. 1 is an assembled, perspective view of a game joystick in accordance with an embodiment of the present invention.
Figure 2:
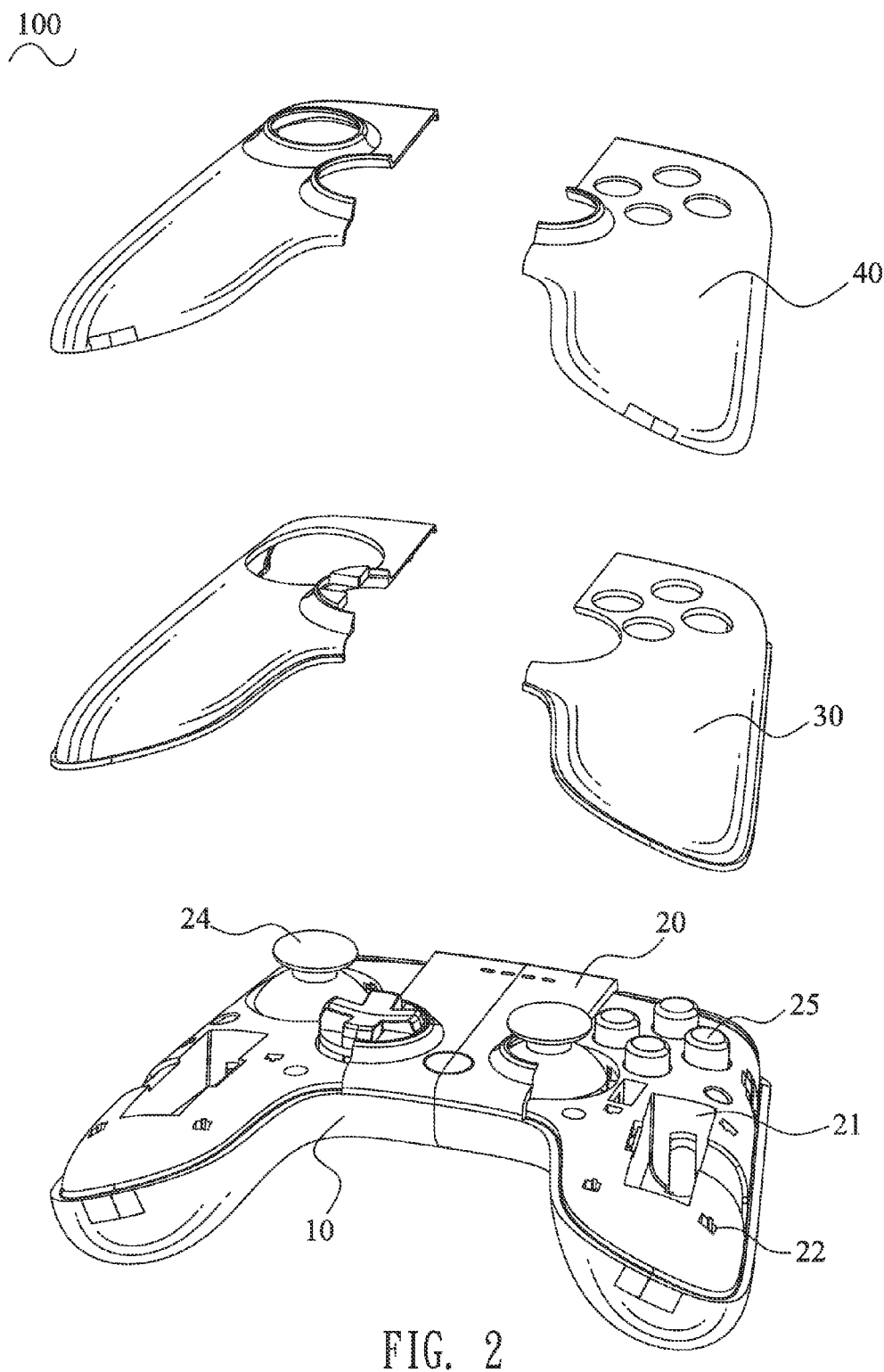
FIG. 2 is an exploded, perspective view of the game joystick shown in FIG. 1.

With reference to FIG. 1 and FIG. 2, an embodiment of the present invention is shown as a game joystick 100 which includes a lower half body 10, an upper half body 20, a pair of battery covers 30, a pair of external covers 40 and a plurality of elastic elements 50.

Referring to FIG. 1 and FIG. 2, the upper half body 20 covers on the lower half body 10. A top face of the upper half body 20 is concaved downward to form a pair of battery slots 21 at two sides thereof. The battery slots 21 are used to receive batteries (not shown) which provide electric power to the game joystick 100. The top face of the upper half body 20 is concaved downward to form a plurality of buckling slots 22. The buckling slots 22 are arranged around the battery slots 21. An opening 221 is opened in one sidewall of each buckling slot 22. A plurality of columns 23 are protruded at the outer sides of the battery slots 21 and arranged around the battery slots 21 in accordance with the openings 221 of the buckling slots 22 of the upper half body 20 respectively. The upper half body 20 is equipped with direction keys 24 and function keys 25.

Figure 3:
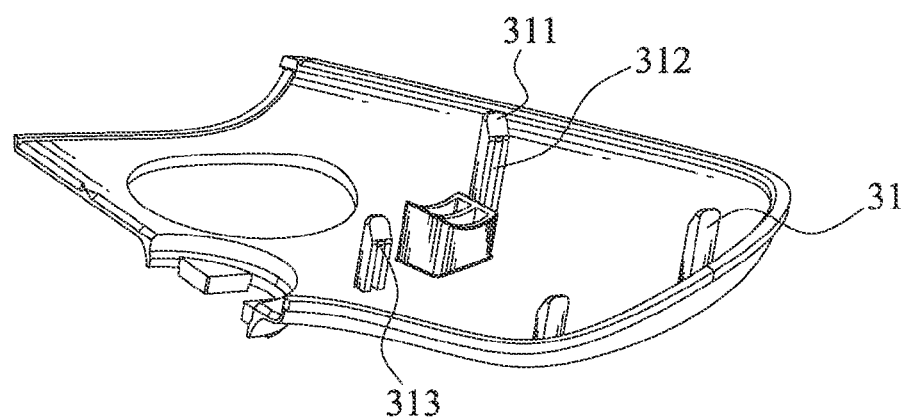
FIG. 3 is a perspective view of a battery cover of the game joystick shown in FIG. 1.

Referring to FIG. 3, the battery covers 30 cover downward on the upper half body 20 and close the battery slots 21 of the upper half body 20. A bottom face of the battery cover 30 protrudes downward to form a plurality of buckling strips 31 corresponding to the buckling slots 22 of the upper half body 20. The buckling strips 31 are inserted into the buckling slots 22 respectively to close the battery cover 30. A bottom end of each buckling strip 31 defines a first pushing surface 311 facing the opening 221 of the buckling slot 22. The first pushing surface 311 of the battery cover 30 is designed in an obtuse angle with the side of the buckling strip 31 towards the opening 221 of the buckling slot 22. One side of each buckling strip 31 towards the opening 221 is concaved inward and extends vertically to form a slide slot 312. A bottom face of the slide slot 312 is designed to a second pushing surface 313 facing the opening 221 of the buckling slot 22. The second pushing surface 313 shows an obtuse angle with the inner sidewall of the slide slot 22. The second pushing surface 313 and the first pushing surface 311 are capable of exerting a pushing force on the corresponding elastic element 50 when opening and closing the battery covers 30.

Referring to FIG. 3, the external covers 40 cover downward on the battery covers 30 respectively.

Figure 4:
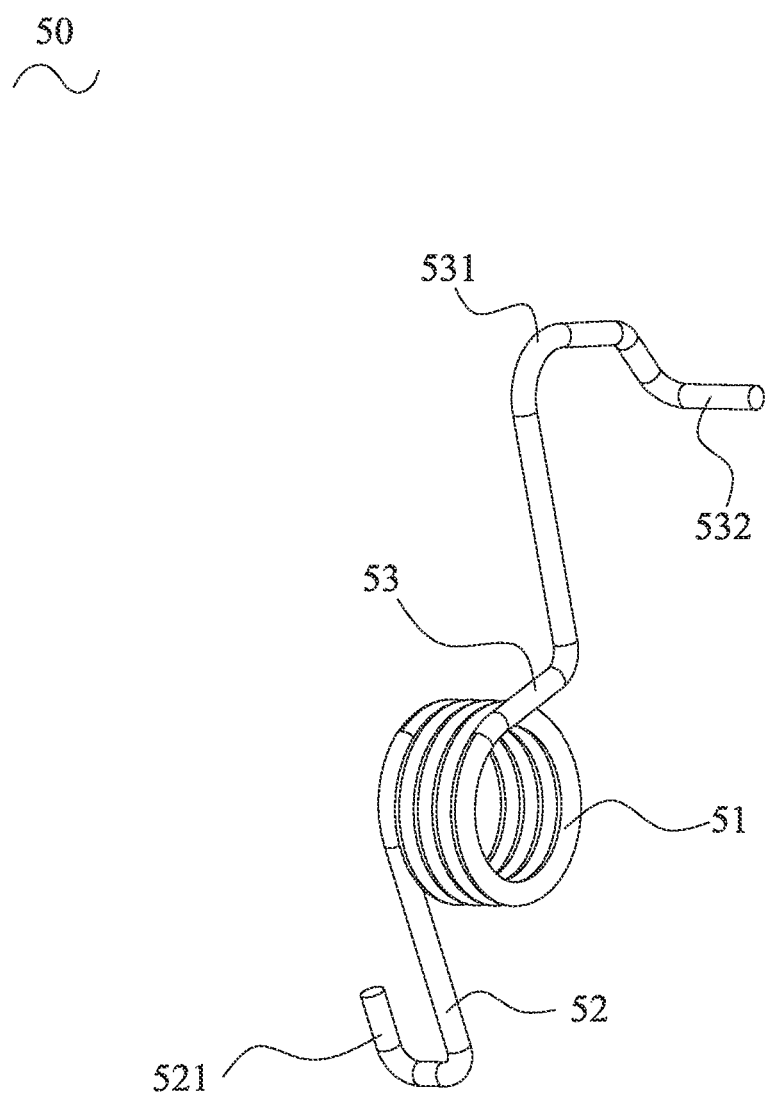
FIG. 4 is a perspective view of an elastic element of the game joystick shown in FIG. 1.

Referring to FIG. 4, the elastic element 50 has a spiral-wound elastic body 51. Two opposite ends of the elastic body 51 extend along the tangent direction to form a first elastic arm 52 and a second elastic arm 53. A tail end of the first elastic arm 51 of the elastic element 50 is bent outward to form a fastening portion 521. A tail end of the second elastic arm 53 of the elastic element 50 slantwise extends upward and then is bent to form an arc-shaped locking portion 531 and the tail end of the locking portion 531 of the elastic element 50 is bent outward to form a blocking portion 532. In the embodiment of the present invention of the game joystick 100, the elastic element 50 is a torsional spring.

Figure 5:
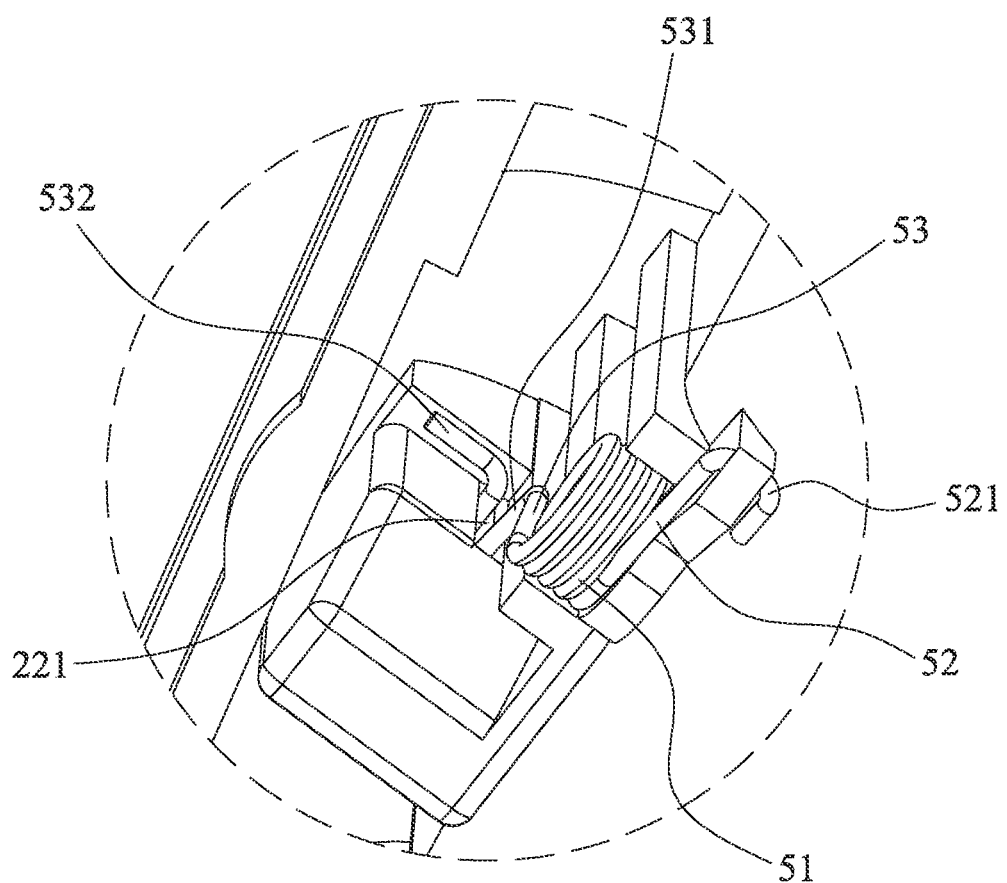
FIG. 5 is a partial enlarged view of the elastic element mounted in the game joystick shown in FIG. 1.

Referring to FIG. 5, the elastic elements 50 are mounted in the upper half body 20 in accordance with the buckling slots 22 of the upper half body 200. The elastic body 51 of the elastic element 50 is worn around the column 23 of the upper half body 20. The fastening portion 521 of the first elastic arm 52 is fastened in the upper half body 20. The locking portion 531 of the second elastic arm 53 elastically projects in the buckling slot 22 through the opening 221 of the buckling slot 22 and resists against the second pushing surface 313 of the buckling strip 31 of the battery cover 30. The blocking portion 532 of the elastic element 50 elastically resists against the outer surface of the buckling slot 22 of the upper half body 20.

Figure 6:
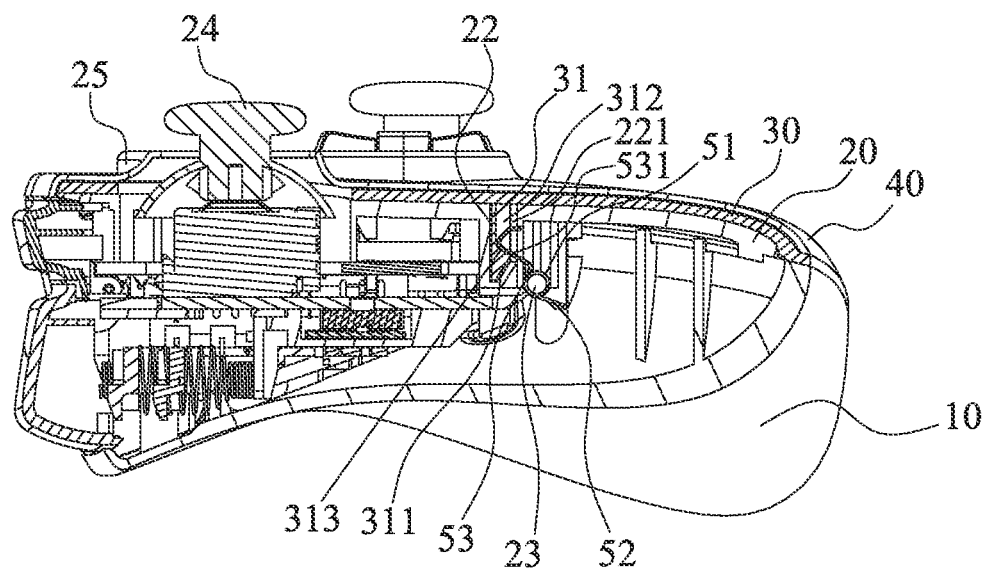
FIG. 6 is a cross-sectional view of the game joystick closing the battery cover.
Figure 7:
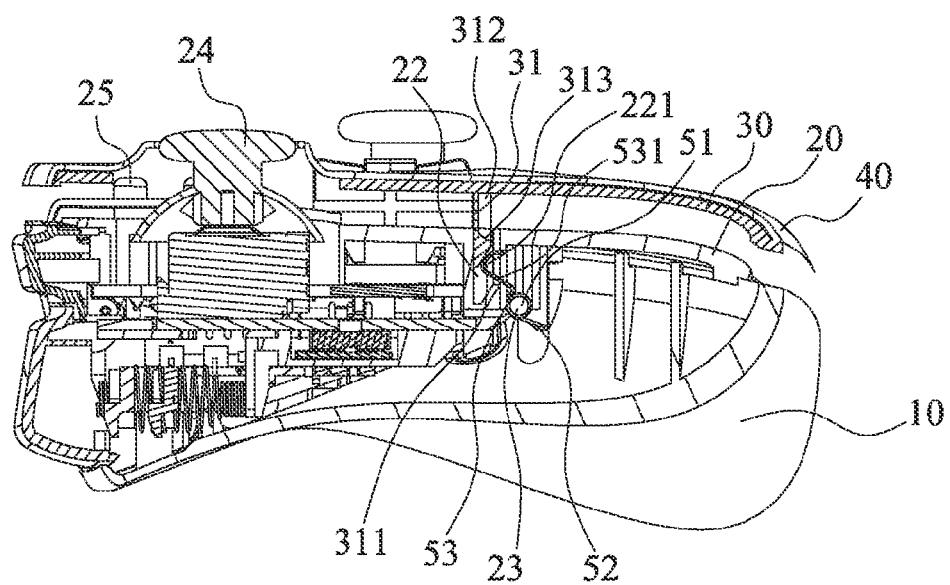
FIG. 7 is a cross-sectional view of the game joystick opening the battery cover.

Referring to FIG. 6 and FIG. 7, when opening the battery cover 30 from the upper half body 20 of the game joystick 100, the second pushing surface 313 of the buckling strip 31 of the battery cover 30 pushes the locking portion 531 of the second elastic arm 53 of the elastic element 50 and the second elastic arm 53 rotates in clockwise direction to free the buckling strip 31 of the battery cover 30 from the locking portion 531. After opening the battery cover 30, the elastic element 50 releases the elastic potential energies to make the locking portion 531 of the second elastic arm 53 elastically project in the buckling slot 22 of the upper half body 20.

Referring to FIG. 7 and FIG. 6, when closing the battery cover 30 to the upper half body 20 of the game joystick 100, the first pushing surface 311 of the buckling strip 31 of the battery cover 30 pushes the locking portion 531 of the second elastic arm 53 of the elastic element 50 and the second elastic arm 53 rotates in clockwise direction to insert the buckling strip 31 of the battery cover 30 into the buckling slot 22 of the upper half body 20. Then, the elastic element 50 releases the elastic potential energies to make the locking portion 531 of the second elastic arm 53 slide over the first pushing surface 311 of the buckling strip 31 to insert into the slide slot 312 of the buckling strip 31 and resist against the second pushing surface 313 of the battery cover 30, so that the battery cover 30 covers on the upper half body 20 of the game joystick 100.

As described above, the embodiment of the invention of the game joystick 100 utilizes the first pushing surface 311 and the second pushing surface 313 pushing the elastic element 50 to rotate in clockwise direction to easily open and close the battery cover 30, and utilizes the elastic element 50 releasing the elastic potential energies to rotate in counterclockwise direction to stably buckle with the buckling strip 31 of the battery cover 30 so as to prevent the battery cover 30 from dropping from the game joystick 100.

What is claimed is:

1. A game joystick, comprising:
   a lower half body;
   an upper half body covering on the lower half body, a top face of the upper half body being concaved downward to form a plurality of buckling slots, an opening being opened in one sidewall of each buckling slot;
   a battery cover covering downward on the upper half body, a bottom face of the battery cover protruding downward to form a plurality of buckling strips corresponding to the buckling slots of the upper half body, the buckling strips being inserted into the buckling slots respectively to close the battery cover, a bottom end of each buckling strip defining a first pushing surface facing the opening of the buckling slot, one side of each buckling strip towards the opening being concaved inward and extending vertically to form a slide slot, a bottom face of the slide slot being designed to a second pushing surface facing the opening of the buckling slot; and
   a plurality of elastic elements mounted in the upper half body in accordance with the buckling slots of the upper half body, each elastic element having an elastic body, a first elastic arm and a second elastic arm, the first elastic arm being fastened in the upper half body, the second elastic arm passing through the corresponding opening to elastically project in the buckling slot of the upper half body, the second elastic arm being capable of sliding over the first pushing surface of the buckling strip to insert into the slide slot of the buckling strip and resist against the second pushing surface when close the battery cover.

2. The game joystick as claimed in claim 1, wherein the first pushing surface of the battery cover is designed in an obtuse angle with the side of the buckling strip towards the opening of the buckling slot, the second pushing surface shows an obtuse angle with the inner sidewall of the slide slot.

3. The game joystick as claimed in claim 1, wherein a tail end of the first elastic arm of the elastic element is bent outward to form a fastening portion, the fastening portion is fastened in the upper half body.

4. The game joystick as claimed in claim 1, wherein a tail end of the second elastic arm of the elastic element slantwise extends upward and then is bent to form an arc-shaped locking portion, the locking portion elastically projects in the buckling slot through the opening of the buckling slot and resists against the second pushing surface of the buckling strip of the battery cover.

5. The game joystick as claimed in claim 4, wherein the tail end of the locking portion of the elastic element is bent outward to form a blocking portion, the blocking portion resists against the outer surface of the buckling slot of the upper half body.

6. The game joystick as claimed in claim 1, wherein the top face of the upper half body is concaved downward to form a pair of battery slots at two sides thereof, the buckling slots are arranged around the battery slots, the battery cover covers the battery slots.

7. The game joystick as claimed in claim 6, wherein a plurality of columns are protruded at the outer sides of the battery slots and arranged around the battery slots in accordance with the openings of the buckling slots of the upper half body respectively, the elastic body of the elastic element is worn around the column of the upper half body.

8. The game joystick as claimed in claim 1, further comprising an external cover, the external cover covers downward on the battery cover.

9. The game joystick as claimed in claim 1, wherein the upper half body is equipped with direction keys and function keys.

10. The game joystick as claimed in claim 1, wherein the elastic element is a torsional spring.

* * * * *